Oct. 24, 1950
A. P. EPSTEIN ET AL
2,526,858
ELECTRICAL PHASING CIRCUIT
Filed June 17, 1948
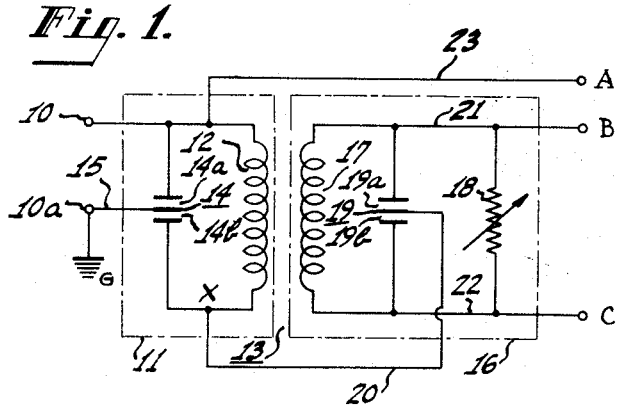
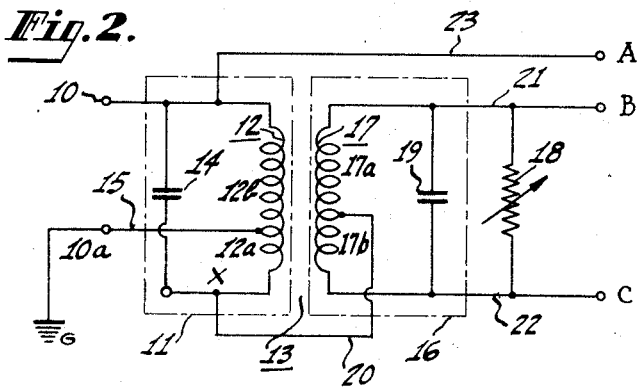
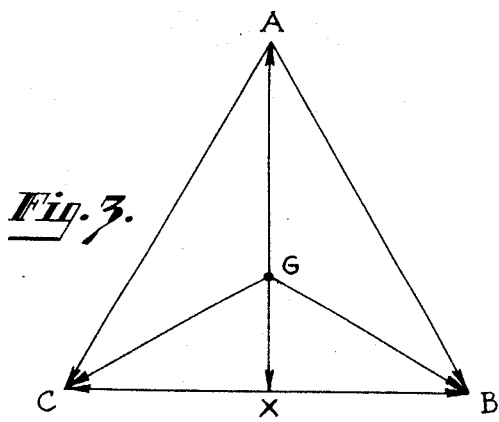
Inventors
ARNOLD S. EPSTEIN
& ALEXANDER KREITHEN
By
Attorney Patented Oct. 24, 1950

2,526,858

UNITED STATES PATENT OFFICE 2,526,858

ELECTRICAL PHASING CIRCUIT

Arnold S. Epstein, Bethlehem, Pa., and Alexander Kreithen, Atlanta, Ga., assignors to Radio Corporation of America, a corporation of Delaware Application June 17, 1948, Serial No. 33,474

10 Claims. (Cl. 321—57)

My invention relates to improvements in electrical phasing circuits, and more particularly to an improved phasing circuit in which single phase alternating voltages may be transformed into polyphase alternating voltages, equal in magnitude and separated in phase by an equal number of electrical degrees.

Various electrical systems have been suggested for transforming a single phase alternating voltage into polyphase voltages, but prior to the present invention such systems have generally been unsatisfactory in many respects. Some have been unduly complex, and relatively difficult to adjust. Others have required that special electrical parts be provided, such as multicore transformers and the like.

Accordingly, it is one object of the present invention to provide an improved electrical phasing circuit which will be extremely simple in form.

Another object is to provide an improved phasing circuit which is simple to adjust.

A further object is to provide an improved electrical phasing circuit using standard, readily available electrical circuit elements.

According to the present invention, these and other objects and advantages are attained by placing divided impedances in parallel with the primary and secondary circuits of a system of tuned coupled circuits, establishing a division point of the primary impedance as a reference point, and connecting the primary circuit to the division point of the secondary impedance. The relative primary and secondary voltages are then adjusted in a simple manner so that voltages taken from one side of the primary and from opposite sides of the secondary will be equal in magnitude, and separated in phase by an equal number of electrical degrees. A more complete understanding of the invention may be had by reference to the following description of an illustrative circuit arranged in accordance with the invention, when read in connection with the accompanying drawing forming a part thereof in which—

Figure 1 is a circuit diagram showing a preferred embodiment of the invention,

Figure 2 is a circuit diagram showing one alternative form of the invention, and Figure 3 is a vector diagram showing the voltage relationships obtaining in the circuits of Figures 1 and 2.

Referring more particularly to the drawing, in which like characters designate similar parts throughout the several views, there is shown, in Figure 1, a phasing circuit having input terminals 10, 10a through which a single phase alternating voltage, at any desired frequency, may be supplied to the primary circuit included within the broken-line block 11. The primary circuit is seen to include the primary winding 12 of a transformer 13 and a split capacitor 14 connected across the primary winding. The capacitor 14 may be fixed or variable, and may consist of either a split capacitor, as shown in Fig. 1, or two capacitors connected in series. For the circuit presently being described, the upper section 14a of the capacitor 14, is given a value of capacitance equal to ½ the value of the lower section 14b, for a reason to be specified hereinafter. The total capacity included in the capacitor sections 14a and 14b will generally be that required to tune the primary circuit 11 to the frequency of the voltage being phased, although at higher frequencies stray capacity in the circuit may vary this slightly. A connection 15 from the division point of capacitor 14 to ground establishes the reference point necessary for correlating the magnitudes and phases of the voltages existing in the primary circuit. The term "ground" will be understood to mean either an actual earth connection or any desired reference point with respect to which output voltages may be taken.

Within the broken-line block 16, the secondary circuit is seen to include the secondary winding 17 of the transformer 13, a variable impedance 18, shown as a simple resistor connected in parallel with the secondary winding 17 of the transformer, and a second split capacitor 19 having sections 19a, and 19b, of equal value, connected in parallel with the secondary circuit. As in the case of the capacitor 14, the capacitor 19 will generally have a total value equivalent to that required to tune the secondary circuit to resonance at the frequency of the voltage being phased, although at high frequencies this may again vary slightly. The capacitor 19 may also be fixed or variable and may comprise a single, two-section element as shown, or two separate capacitors of equal value. A lead 20 is connected from the division point of the capacitor 19 to one end of the primary circuit 11 for a purpose which will appear in the statement of operation to follow. Output leads 21 and 22 taken from opposite ends of the secondary circuit 16, and an output lead 23 taken from that end of the primary circuit 11 corresponding to the ungrounded input terminal 10 complete the phasing circuit.

For an understanding of the operation of the circuit shown in Figure 1, reference is made to Figure 3 wherein the relative magnitude and phase of the voltages existing between certain specified points in the circuit are shown vectorially. Reference letters A, B, C, G, and X have been supplied to accurately indicate the points of voltage in question. Considering point X as a first reference point, the voltage across the primary circuit may be represented by a vector AX. Since the lower capacitor section 14b has a value equal to twice that of the upper capacitor section 14a, then, according to the usual relationships obtaining as to the voltages across capacitors in series, the voltage across each section of the series 14a, 14b will be inversely proportional to the size of the capacitor sections, and therefore the voltage GA will be equal to twice the voltage GX. Also, since the voltages GA and GX are taken in opposite directions with respect to the point G, voltages GA and GX will be 180° out of phase, all as shown vectorially in Figure 3.

According to further well known principles, in a system of coupled tuned circuits as in Figure 1, the voltage across the secondary circuit will be 90° out of phase with the voltage across the primary circuit, and in Figure 3 this relationship is shown by a vector CB placed at an angle of 90° to the vector AX. Furthermore, since the capacitor sections 19a and 19b are of equal value, the voltage across each section will be the same, although differing in phase by 180° since they are taken in opposite directions with respect to the point X, and the voltages taken from each end of the tuned secondary to the voltage midpoint thereof may therefore be established as equal vectors BX and CX.

In order to establish the relative magnitudes of these various voltages, it is a simple matter to adjust variable impedance 18 as may be necessary to make the voltages CB, AC, and AB equal in magnitude.

The following geometrical relations may now be specified for the vector diagram of Figure 3:

1. Since the voltages AB, AC, and BC are equal, the triangle ABC is an equilateral triangle.
2. Since the point X is the midpoint of the vector CB, the primary voltage vector AX represents one median of the equilateral triangle ABC, where a median is understood to be a line from any vertex of a triangle to the midpoint of the side opposite to that vertex.
3. Since the voltage GA is equal in magnitude to twice the voltage GX, and since the point of intersection of the medians of an equilateral triangle is known to be a point on any median spaced ⅔ of the distance from its vertex to the side opposite thereto, the point G corresponds to the point of intersection of the medians of triangle ABC.

The magnitude and phase relations between the three voltages GA, GB, and GC may now be readily determined from the vector diagram.

First, it is apparent that the three vectors GA, GB, and GC are equal in magnitude, since they represent similar sections of the medians of the triangle ABC. Secondly, it is apparent that the angles AGB, BGC and AGC between the three vectors are equal, as being the angles between the medians of equilateral triangle ABC. These angles will of course be understood to be equal to 120 electrical degrees. Hence, it will be apparent that a circuit such as that shown in Figure 1 is capable of transforming a single phase alternating voltage input to a three phase alternating voltage input to a three phase alternating voltage output in an extremely simple and efficient manner.

In connection with the circuit thus far shown and described, it will be appreciated that the divided capacitors 14 and 19 perform a dual function in the circuit, in that they serve both to tune their respective circuits to the desired frequency and to provide reference voltage points intermediate the ends of the tuned circuits. It will be understood that separate capacitors could be used to tune the circuits, or that separate divided impedances could be arranged in parallel with the circuits to establish the desired voltage points intermediate the ends of the circuits.

In Fig. 2, I have shown a further possible modification in which the capacitors 14 and 19 are single-section elements, and the primary and secondary windings of the transformer 13 are tapped to provide the impedance division points required. In this modification, if the upper section 12b of the primary winding 12 has a value of inductance equal to twice that of the lower section 12a, and if the two sections 17a and 17b of the secondary winding 17 have equal values of inductance, the operation of the circuit of Fig. 2 will substantially parallel that of the circuit of Fig. 1. In Fig. 2, the transformer windings perform the same voltage dividing function as the capacitors 14 and 19 in Fig. 1, and the vector diagram of Fig. 3 is equally applicable to the circuits of Figs. 1 and 2. It is believed that the operation of the circuit of Fig. 2 will be apparent without further detailed explanation. It will also be appreciated that the variable impedance 18 in Fig. 2 could be center-tapped rather than the secondary winding 17 of the transformer, and that the lead 20 could be transferred from the winding 17 to such center tap of the variable impendance 18 without varying the essential mode of operation of the circuit. Also, it will be apparent that the same tuned circuits which are magnetically or inductively coupled in the diagrams shown may be capacitively coupled, as it well known.

While the circuits as shown are considered to be preferable from the standpoint of simplicity, it is apparent that such modifications as those suggested, as well as others, could be made without departing from the scope or spirit of the invention as defined in the appended claims. Therefore, the foregoing description is to be construed as illustrative, and not in a limiting sense except as required by such claims.

Having described our invention, what we claim is:

1. In an apparatus for converting single phase alternating voltage to polyphase alternating voltages comprising a primary circuit tuned to a predetermined frequency and including a first divided impedance as a parallel connected element thereof, a first input terminal connected to a division point in said first divided impedance, a secondary circuit tuned to said predetermined frequency and electrically coupled to said primary circuit, said secondary circuit including a second divided impedance as a parallel connected element thereof, means for varying the total impedance of said secondary circuit, a connection from a division point in said second divided impedance to one end of said first divided impedance, a second input terminal connected to the other end of said first divided impedance, a first output terminal connected to said second input terminal, and second and third output terminals connected to said secondary circuit on opposite sides of said division point in said second divided impedance.

2. In an apparatus for converting single phase alternating voltage to polyphase alternating voltage comprising a primary circuit tuned to a predetermined frequency and including a primary inductance, a first divided impedance in parallel with said primary inductance, a first input terminal connected to a division point in said first divided impedance, a secondary circuit tuned to said predetermined frequency including a secondary inductance electrically coupled to said primary inductance, a second divided impedance in parallel with said secondary inductance, means for varying the total impedance of said secondary circuit, a connection from a division point in said second divided impedance to one end of said first divided impedance, a second input terminal connected to the other end of said first divided impedance, a first output terminal connected to said first input terminal, and second and third output terminals connected to opposite ends of said second divided impedance.

3. In an apparatus for converting single phase alternating voltage to polyphase alternating voltages comprising a primary circuit tuned to a predetermined frequency and including a primary inductance, a first divided impedance in parallel with said primary inductance, a first input terminal connected to a division point in said first divided impedance, a secondary circuit tuned to said predetermined frequency including a secondary inductance inductively coupled to said primary inductance, a second divided impedance in parallel with said secondary inductance, means for varying the total impedance of said secondary circuit, a connection from the division point in said second divided impedance to one end of said first divided impedance, a second input terminal connected to the other end of said first divided impedance, a first output terminal connected to said first input terminal, and second and third output terminals connected to opposite ends of said second divided impedance.

4. In an apparatus for converting single phase alternating voltage to polyphase alternating voltages comprising a primary circuit tuned to a predetermined frequency and including a primary inductance, a first divided capacitor in parallel with said primary inductance, a first input terminal connected to a division point in said first divided capacitor, a secondary circuit tuned to said predetermined frequency including a secondary inductance inductively coupled to said primary inductance, a second divided capacitor in parallel with said secondary inductance, means for varying the total impedance of said secondary circuit, a connection from a division point in said second divided capacitor to one end of said first divided capacitor, a second input terminal connected to the other end of said first divided capacitor, a first output terminal connected to said first input terminal, and second and third output terminals connected to opposite sides of said second divided capacitor.

5. In an apparatus for converting sinple phase alternating voltage to polyphase alternating voltages comprising a primary circuit tuned to a predetermined frequency and including a primary inductance, a first divided capacitor in parallel with said primary inductance, a first input terminal connected to a division point in said first divided capacitor, a secondary circuit tuned to said predetermined frequency and electrically coupled to said primary circuit and including a secondary inductance, a second divided capacitor in parallel with said secondary inductance, means for varying the total impedance of said secondary circuit, a connection from a division point in said second divided capacitor to one end of said first divided capacitor, a second input terminal connected to the other end of said first divided capacitor, a first output terminal connected to said first input terminal, and second and third output terminals connected to opposite sides of said second divided capacitor.

6. In an apparatus for converting single phase alternating voltages to polyphase alternating voltages comprising a transformer having a primary winding and a secondary winding, a first capacitor connected between one terminal of said primary winding and an intermediate point on said primary winding, a second capacitor connected between the other terminal of said primary winding and said intermediate point, a plurality of series connected capacitors arranged in parallel with said secondary winding, a connection from said other primary winding terminal to the midpoint of said series connected capacitors, a variable resistor in parallel with said secondary winding, a pair of input terminals connected to said one primary winding terminal and said intermediate point, a first output terminal connected to said one primary winding terminal, and second and third output terminals connected to opposite ends of said secondary winding.

7. Apparatus as set forth in claim 1 wherein said first divided impedance consists of first and second sections, said first section having a value of impedance which is equal to twice the impedance of said second section.

8. Apparatus as set forth in claim 1 wherein said second divided impedance consists of two sections having equal values of impedance.

9. Apparatus as set forth in claim 1 wherein said first divided impedance consists of first and second sections, said first section having a value of impedance which is equal to twice the impedance of said second section, and wherein said second divided impedance consists of two sections having equal values of impedance.

10. Apparatus as defined in claim 1 wherein said first and said second divided impedances each comprise a tapped transformer winding.

ARNOLD S. EPSTEIN.
ALEXANDER KREITHEN.

No references cited.